United States Patent [19]

Park et al.

[11] Patent Number: 4,828,908
[45] Date of Patent: May 9, 1989

[54] VANDAL RESISTANT SEAT

[75] Inventors: Ronald S. Park, Dandenong; John A. Clements, Noble Park; William H. Maloney, Mt. Waverley, all of Australia

[73] Assignee: Henderson's Federal Spring Works Pty. Ltd., Victoria, Australia

[21] Appl. No.: 187,955

[22] Filed: Apr. 29, 1988

[30] Foreign Application Priority Data

Apr. 29, 1987 [AU] Australia ................ PI01639

[51] Int. Cl.$^4$ ................................. B32B 3/26
[52] U.S. Cl. ................... 428/247; 428/256; 428/269; 428/285; 428/309.9; 428/316.6
[58] Field of Search ............... 428/309.9, 316.6, 317.9, 428/256, 269, 285

[56] References Cited

U.S. PATENT DOCUMENTS

| | | | |
|---|---|---|---|
| 3,188,302 | 6/1965 | Lorenz | 528/63 |
| 3,298,884 | 1/1967 | Willy | 156/79 |
| 3,644,168 | 2/1972 | Bonk et al. | 428/318.8 |
| 3,647,608 | 3/1972 | Enlow et al. | 428/303 |
| 4,061,815 | 12/1977 | Poole, Jr. | 428/215 |
| 4,265,042 | 5/1981 | Isola | 42/98 |
| 4,266,042 | 5/1981 | Park | 521/123 |
| 4,347,276 | 8/1982 | Weber et al. | 428/160 |
| 4,379,103 | 4/1983 | Doerfling | 264/45.5 |
| 4,423,103 | 12/1983 | Bogdany | 428/304.4 |
| 4,673,613 | 6/1987 | Ward | 428/247 |

FOREIGN PATENT DOCUMENTS

| | | | |
|---|---|---|---|
| 64002 | 3/1969 | Australia | 428/316.6 |
| 2229368 | 12/1974 | France . | |
| 2505311 | 11/1982 | France . | |
| 1243514 | 8/1971 | United Kingdom . | |
| 1456805 | 11/1976 | United Kingdom . | |
| 2041742A | 9/1980 | United Kingdom . | |
| 2041742B | 5/1983 | United Kingdom . | |

Primary Examiner—William J. Van Balen
Attorney, Agent, or Firm—Mason, Fenwick & Lawrence

[57] ABSTRACT

An cut-resistant seat or seating material is disclosed together with methods of forming such a material. The material comprises at least one layer of flexible metal or non-metal matrix material embedded within a compressed flexible foam material. The foam material may be a fire retardant flame material.

23 Claims, No Drawings

VANDAL RESISTANT SEAT

The present invention relates to a vandal resistant seat and methods of manufacture thereof and relates particularly but not exclusively to a vandal resistant seat cover material and to methods of manufacture thereof.

In recent years there has been a growing awareness of the need for seats or seating materials to have a greater resistance to combustion. This is particularly so in situations where numbers of people may be at risk by exposure to toxic fumes produced by combustion of seating materials in public buildings, hospitals, public transport vehicles and aircraft where substantial amounts of combustible seating materials may be present.

Polyvinylchloride foams used as seat cushioning have relatively good performance in resisting fire or the spread of fire but their comfort and recovery properties are poor. Sheets of neoprene (polychloroprene) have been used to protect polyurethane seat cushioning but if this sheeting is cut by a vandal or otherwise exposed, the fire protection properties are reduced or even eliminated.

Seating in public transport vehicles such as trains, trams etc. are subject to excessive vandalism both by fire and by slashing seating with sharp instruments such as knives. Such vandalism costs the public many thousands of dollars annually, to repair or replace damaged seating and exposes the public to dangers particularly if the vandalism includes attempting to set fire to such seating. Dangers resulting from the production of toxic fumes on combustion of seating is of particular concern in modern public transportation vehicles which have fixed windows and remote controlled automatically closing doors where ventilation systems may be inadequate to remove toxic fumes in an emergency situation where a power failure may occur or when doors may become jammed and difficult to open. The dangers of production of toxic fumes is enhanced if the seating material is able to be torn or slashed thus exposing underneath materials such as padding materials which may not be fire resistant.

It is an object of this invention therefore to provide a flame retardant seating material and which is resistant to damage by a sharp object such as a knife wielded by a vandal. It is also an object of this invention to provide a method of manufacture of such a seating material which is simpler and more efficient and thus resulting in lower production costs than has previously been known or described.

Several attempts have previously been made to overcome the problem of damage to seating by vandals or merely to provide tear resistance to foamed plastics materials whether rigid or flexible foams. One such product is described in U.S. Pat. No. 3,298,884. This patent discloses a reinforced plastics foam material in which the reinforcing comprises a discontinuous layer of reinforcing strands. The plastics foam precursors are applied to the reinforcing material and the plastics material foamed in situ in appropriate apparatus utilising a carrier and cover sheet to support and constrain the materials during processing. The carrier and cover sheets are compressed towards each other to squeeze excess foaming mixture from between the sheets and to force the mixture fully through and around the strands of the reinforcing material prior to the foaming of the mixture to fill the interstices and coat the strands with the foaming mixture. The carrier and cover sheets are thereafter freed from the squeezing action to permit the foaming mixture to foam and produce a substantially uniform foam product on either side of and throughout the reinforcing material.

The method described produces a reinforced foam material which is resistant to tearing when subjected to shear or tensional forces. The patent does not specifically disclose that the product is resistant to damage due to misuse or abuse with a sharp object such as a knife.

U.S. Pat. No. 3,647,608 (GB No. 1,349,866) discloses a cut resistant flexible foam article having a skin, a polymeric foam structure beneath the skin, the foam structure having a layer of metal wires in the form of unconnected, randomly oriented, flexible metal fibres or in the form of "wire mail" being a flexible mesh of metallic wires in the form of small metal rings or squares interlinked to allow relative movement between adjacent wires. Whilst the patent describes a reinforced cushioning material which is resistant to e.g. knife damage, the resiliant mixture of the flexible foam material in which the reinforcing is embedded will still allow tearing of the foam material if sufficient forces are applied.

U.S. Pat. No. 4,423,103 and GB Pat. No. 2,041,742B as well as GB Patent Application No. 2,041,742A disclose a similar article to U.S. Pat. No. 3,647,608 in which the reinforcing material comprises a network of metallic spiral coil springs (such as the type commonly employed in spring mattresses) having their axes parallel with the cover material and in which the turns of each of the springs are intertwined with turns of adjacent coils. The coils are at least partially embedded (and may be fully embedded) but are preferably only partially embedded in a layer of foamed plastics material. This material suffers from the disadvantage that the coil springs may partially protrude from the underneath of the material which may not be desirable. Additionally, it is possible that should a spring or a coil or turn of the spring be broken, the end or ends of the spring or turn could eventually protrude through the upper surface of the composite material presenting a danger of possible injury to a user.

U.S. Pat. No. 4,673,613 discloses a similar article to that disclosed in U.S. Pat. No. 4,423,103 wherein it is required that the reinforcing wire mesh member is fully embedded within the foamed plastics material of the article. The preferred wire mesh is a mattress mesh similar to that disclosed in U.S. Pat. No. 4,423,103. Whilst this patent (U.S. Pat. No. 4,673,613) overcomes one of the disadvantages of U.S. Pat. No. 4,423,103 in that the wire mesh is fully embedded, the problem still remains that it is possible for a broken wire coil or turn to protrude above the surface of the material producing a potential injury danger to a user. The present invention seeks to overcome or reduce the disadvantages or deficiencies of the prior art articles.

The present invention therefore provides a cut-resistant seat or seating material comprising at least one layer of a flexible metal or non-metal matrix material and a compressed flexible foam polymer material in which the matrix material is embedded within the compressed flexible foam polymer material.

The present invention therefore provides a method of forming a cut resistant seat or seating material which comprises introducing a metal or non-metal matrix material into a mould, introducing a foamable plastics material into said mould, causing or allowing the foamable plastics material to foam and expand to form a "green" or uncured expanded foam material completely surrounding the matrix material, subsequently compressing the foamed plastics material to substantially remove gases therein and concurrently or substantially curing the material.

The present invention therefore provides a method of forming a cut resistant seat or seating material which comprises forming a foamed plastics material preform of predetermined constant cross-section, partially curing said preform, forming a sandwich combination of metal or non-metal matrix between two of said partially cured preforms, compressing said sandwich and completely curing said combination.

The seating material may be produced in the form of a sheet which can be stored in rolls or in the form of cut sheet or may be formed during manufacture to the required shape for a seat cushion for subsequent addition of a resilient foam plastics or other cushioning material. The seat may be in the form of a moulded cushion precursor for the back or posterior or in the form of a combination thereof. The seat or seating material may also include a layer of a decorative cover material or may be "textured" on its proposed exposed surface by appropriate mould surface treatment.

The polymer may be any foamable polymer composition which preferably has the following properties:

Acceptable flexibility, when formed as a composite with the matrix, to provide reasonable comfort.

Flame retardancy to the degree that spread of flame fron one seat to another is retarded or prevented.

Production of limited and acceptable amounts of toxic gases on combustion or attempted combustion.

Suitable polymers include flame retardant polyvinylchlorides; polyvinylidene chlorides; polychloroprenes; polyisoprenes and other synthetic rubbers; polyurethanes and copolymers thereof or copolymers with other polymers known in the art to be suitable for the purpose. These polymers may be processed or prepared as foamed polymers then compressed. A particularly suitable foamed polymeric material for the purposes of this invention is the foamed polymeric material disclosed in U.S. Pat. No. 4,266,042 which relates to polymeric foam materials having good flame retandancy.

The matrix embedded in the polymer may be either a woven or non woven mesh or interengaged coil matrix of a metal or synthetic material or natural fibre or wire which resists penetration of, for example, a knife blade point. It is preferred that the matrix consists of a woven metal wire mesh and most preferably a wire mesh of 6 mesh 20 gauge 304 woven stainless steel wire.

The present invention also provides a method of forming a cut-resistant seat or seating material which comprises introducing a metal or non metal matrix material into a mould, introducing a foamable plastics material into said mould, causing or allowing the foamable plastics material to foam and expand to form a "green" or uncured expanded foam material completely surrounding the matrix material, subsequently compressing the foamed plastics material to substantially remove gases therein and concurrently or substantially curing the material.

The foamed material may be compressed in a ratio of from 1 to 1 to a ratio as great as 30 to 1 depending on the exact nature of the foamable plastics material utilised. The product may be manufactured in a batch-wise method or may be manufactured in a continuous process as described in the aforementioned U.S. Pat. No. 3,298,884 with the addition of suitable apparatus to apply the requisite partial curing, compression and final curing of the foamed material.

The compression ratio is as indicated variable according to the nature of the foamed polymeric material utilised but is preferably from about 3 to 1 to 15 to 1.

The reinforcing matrix utilised by the present invention is preferably substantially incompressible under the conditions necessary to compress the foamed plastics material to its desired final compressed state.

The decorative cover material is preferably flame retardant in its own right. Such materials include flame retarded woollen material, vinyl sheet material or sprayed polyurethane coating for example. The decorative cover material may be moulded directly on to the compressed foam seat or seating material or may be secured to the compressed foam seat or seating material by use of a suitable adhesive. In either case it is preferable that the bond between the cover material and the compressed foam seat or seating material is stronger than the bond or bonding of the cover material itself.

A particularly preferred polymer for the production of a compressed foam seating material is polyurethane including polyester polyurethane, polyether polyurethane, or polyurea. The polyhydroxy variety may be a polyester polyol derived from the reaction of a dibasic acid with a dihydric alcohol or derived by other means known in the art. Polyesters particularly suitable are those which are linear or slightly branched chain polyesters such as the "Estolan" series of polyesters of Lankro Chemicals or the "Diorez" series of polyesters of Briggs & Townsend Ltd. These polyesters have a molecular weight in the range of 1000 to 2000 or thereabouts. Polyethers suitable for making the polyurethanes of the invention are diols or triols having a molecular weight of the order of from 1000 to 7500 with preferably at least 50% of the hydroxy end groups being primary hydroxy groups. These polyols are liquids at ambient temperatures or capable of being liquified for handling in a polyurethane machine. Examples of suitable diols or triols are linear- or branched- polyoxypropylene polyols, block copolymers of ethylene oxide or propylene oxide and polyol graft polymers of ethylenically unsaturated monomers such as styrene and acrylonitrile graft polymers of the aforementioned polyols.

Examples of suitable triols commercially available are CP 4701 (Dow Chemicals), NIAX 11-34 (Union Carbide), Desmophen 3900 (Bayer); Propylan M12 (Lankro), and Carbide), T32-75 (ICI). Examples of suitable diols commercially available are D 2122 (Lankro) and Daltocel BA56 (ICI). Examples of suitable grafted polyols or polymer polyols or PHD polyols (i.e. dispersious of polyvinyl or polyurea compounds in diol or triol polyols) commercially available are Niax 34-28 (Union Carbide), Pluracol 581 (BASF-Wyandotte) and PU 3119 (Bayer).

Water is usually added to the urethane blend as a blowing agent to create a foam plastics material since it reacts with excess isocyanate to liberate carbon dioxide. Alternatively a halogenated hydrocarbon such as trichlorofluoro-methane, methylene chloride, or dichlorodifluoro-methane may be used, as is known in the art. Alternatively the frothing or foaming agent for the polymers may be a gas such as air, nitrogen or carbon dioxide mechanically mixed or frothed into the polymer mixture to produce the desired foam product. In some cases also it may be necessary to use a combination of these foam producing or foaming or frothing methods.

Preferred isocyanates are toluene di-isocyanate (TDI) and polymethylene polyphenyl di-isocyanate and diphenylmethane di-isocyanate (both of which are known as MDI). Mixtures of these isocyanates and mixtures isocyanates with a polyol (e.g. CP4701) also form a useful adduct. Any other known aromatic or aliphatic isocyanate known in the art may also be used either alone or in admixture.

The amount of isocyanate required to be added in the foam producing reaction is requlated the stoichiometric of the particular reaction with an index or stoichiometric ratio of from 95 to 105 being particularly preferred.

The polyol blend also contains significant quantities of a flame retardant component to produce the flame retardant properties desired in the final product. Such flame retardant component may be for example from 5 to 20 parts by weight of antimony trioxide, 30 to 50 parts by weight of a chloroparaffin or mixtures thereof and 30 to 80 parts by weight of alumina trihydrate based on 100 parts by weight of the polyol. Another example of suitable flame retardant compositions are those disclosed by Upjohn in British Pat. No. 1456805—8 parts antimony trioxide, 11 parts pentrabromoethylbenzene and 9 parts alumina trihydrate.

Other compounds well known to the art may be used in the polymer blend for example phosphorus nitrogen and boron compounds or mixtures thereof may be included. Furthermore compounds such as melamine, urea and other known compounds which modify the burning characteristics of urethane polymers to give a protective char may be used as reactive flame retardant additives. Other such additives include phosphonated polyols, brominated polyols and cross linking agents. Materials which modify the urethane combustion to reduce smoke may also be included. An example of such a smoke reducing agent or inhibitor is maleic anhydride.

Other foam stabilising or enhancing agents which may be included are e.g. silicone surfactants, organometallic catalysts and tertiary amine catalysts (as are known in the art).

By way of example only one suitable composition and method of preparation of seats or seating in accordance with the invention is as follows:

|   |   | PARTS BY WEIGHT |
|---|---|---|
| (A) | POLYOL PREBLEND | |
|   | CP 4701 | 60.0 |
|   | NIAX 34-28 | 40.0 |
|   | CERECHLOR 70 L | 35.0 |
|   | ANTIMONY TRIOXIDE | 10.0 |
|   | ALUMINA TRIHYDRATE | 50.0 |
|   | L 5307 | 2.0 |
|   | DIBUTYLTINDILAURATE | 0.03 |
| (B) | CATALYST PREBLEND | |
|   | WATER | 2.7 |
|   | NIAX A1 | 0.2 |
|   | NIAX A4 | 0.3 |
|   | DATCO 33 LV | 0.35 |
| (C) | ISOCYANATE BLEND | |
|   | 80 TDI 20 MDI | 35.5 |

Note
Can use 100 parts of either CP4701 or NIAX 34-28 with appropriate adjustment of the catalyst blend as is known in the art.

Separate streams of each of the above component blends A, B & C are preferably temperature conditioned by way of appropriate heat exchange means prior to combination of the three. The polyol blend A was brought to 35°±1° C., the other two 'blends' B and C maintained at 25°±1° C.

The components A, B & C were introduced into a 'Halco' low pressure polyurethane moulding machine by pumps set to deliver the required amounts of each component to be mixed and also to deliver the required output volume to the mould. Mixing was accomplished in a low pressure, high shear mixer as is known in the art. (High pressure mixers are also capable of being used for this purpose).

Prior to deposition of the mixed components into the mould the following steps were taken.

The mould was lightly sprayed (as is customary) with a suitable mould release agent.

A stainless steel wire mesh 20 gauge 304 was cut to size and shaped (conveniently in an appropriate jig) to the outline or contour of the seat mould desired then placed in the seat mould and separated from the surface of the mould by appropriate spacers or spacer pins.

A collar was then placed around the top of the mould and the mixed foam components were then introduced into the mould and the lid closed tightly on the mould and the foam components allowed to react.

When the foam has finished reacting but before it has been cured, the collar of the mould is removed and the lid again closed to compress the 'green' foam. The compressed green foam and mesh combination is retained in the device, depending on foams used and volumes and dimensions of the object being formed for about 1 to 10 minutes to allow time for the compressed foam - mesh combination to cure or partially cure. The article produced can then be removed from the mould and the above process steps repeated. The mould is heated either electrically or by hot water as is known and maintained at 50°±2° C. during the moulding process. This temperature may be reduced by varying other operating parameters such as increased or varied catalysis or increased dwell times in the mould. In a further alternative process a two stage mould or moulding process may be used. Where a product of complex shape is to be moulded, a diaphragm may be placed over the green foam, the lid of the mould closed and the required compressive forces applied by introduction of a fluid—gas or liquid—between the diaphragm and the mould lid.

In the preferred process described the foams may be compressed from 2½ inches (65 mm) or 1 inch (25 mm) to a compressed foam of ¼ (5 mm) or less as the thickness of the included mesh and/or the foamed material dictates. By way of example, a foam having the density indicated below may be compressed in the ratio shown:

| Foam density | Compression ratio |
|---|---|
| 2 lb/ft³ | 15:1 approx |
| 3 lb/ft³ | 9:1 approx |
| 5 lb/ft³ | 5:1 approx. |

The surface of the product obtained from the above described process may be cleaned and treated with suitable adhesives to enable the adhesion of a decorative cover material. For example a flame retardant neoprene based adhesive may be applied to the surface and to the surface of the proposed cover material and each allowed to dry. The two parts are then bonded by contacting the surface with the cover material and application of appropriate pressure.

A "hollow" product obtained may then be attached to an appropriate frame, filled with a resilient foam material and attached as necessary to a seat back or base as a posterior or back support "cushion" for a seat which is thus resistant to slashing or damage by attack by a sharp object such as a knife or razor.

The combination of the fire retardant compressed foam construction having a mesh embedded (either wholly or partially) therein provides for a vandal resistant seat or seat cushion or the like which is superior to those currently known with regard to resistance to fire or flame and attack by sharp instruments such as a knife and which is cheaper and quicker to manufacture. As the preblend or preformed ingredients or materials may be mixed immediately prior to injection or delivery to the mould there is no great problem with ingredient preblends having limited 'pot' life.

In an alternative process of producing a mesh reinforced product according to the invention, a foam may be produced from a blocked or hindered prepolymer material which is screeded to give a foam of desired thickness and partially cured to form a foam material stable at ambient temperature. This foam material may then be used to form a sandwich on either side of an appropriate mesh material and compressed in an appropriate mould at an elevated temperature to reactivate the blocked or hindered polymer and form a mesh containing compressed foam material. The stable foam material may, as will be appreciated, be used immediately to form the compressed foam mesh sandwich or stored at ambient temperature and processed later.

THE CLAIMS DEFINING THE INVENTION ARE AS FOLLOWS:

We claim:

1. A cut-resistant seat covering material comprising at least one layer of a substantially incompressible flexible matrix material embedded within a compressed flexible foam polymer material, said flexible foam polymer material being formed from an uncured or partially cured expanded flexible foam polymer material which has been compressed in a ratio of from 3:1 to 30:1, whereby substantially all of the gas produced during foaming of said expandable flexible foam polymer material has been removed therefrom.

2. An article as claimed in claim 1, said flexible foam polymer material being formed from an uncured or partially cured expanded flexible foam polymer material which has been compressed in a ratio of from 3:1 to 15:1.

3. An article as claimed in claim 1, said matrix material being a metal.

4. An article as claimed in claim 1, said matrix material being a non-metal.

5. An article as claimed in claim 1, said matrix material being a woven mat of metal fibers.

6. An article as claimed in claim 1, said matrix material being a woven mat of metal wires.

7. An article as claimed in claim 1, said matrix material being a non-woven mat of metal fibers.

8. An article as claimed in claim 1, said matrix material being a non-woven mat of metal wires.

9. A cut-resistant seat covering material comprising at least one layer of a substantially incompressible flexible matrix material embedded within a compressed flexible foam polymer material from which substantially all of the gas produced during foaming has been removed.

10. An article as claimed in claim 9, said matrix material being a metal.

11. An article as claimed in claim 9, said matrix material being a non-metal.

12. An article as claimed in claim 9, said matrix material being a woven mat of metal fibers.

13. An article as claimed in claim 9, said matrix material being a woven mat of metal wires.

14. An article as claimed in claim 9, said matrix material being a non-woven mat of metal fibers.

15. An article as claimed in claim 9, said matrix material being a non-woven mat of metal wires.

16. An article as claimed in claim 9 in which said matrix is a woven wire mesh.

17. An article as claimed in claim 9 in which said matrix material is a stainless steel woven wire mesh.

18. An article as claimed in claim 9 in which said matrix material is a mesh of 6 mesh 20 gauge 304 woven stainless steel wire.

19. An article as claimed in claim 9 in which said flexible foam polymer material is a fire retardant foam polymer material.

20. An article as claimed in claim 1 in which said matrix is a woven wire mesh.

21. An article as claimed in claim 1 in which said matrix material is a stainless steel woven wire mesh.

22. An article as claimed in claim 1 in which said matrix material is a mesh of 6 mesh 20 gauge 304 woven stainless steel wire.

23. An article as claimed in claim 1 in which said flexible foam polymer material is a fire retardant foam polymer material.

* * * * *